(No Model.) 9 Sheets—Sheet 2.

E. THOMSON & C. E. HARTHAN.
CHAIN MAKING MACHINE.

No. 512,848. Patented Jan. 16, 1894.

WITNESSES:

INVENTORS
Elihu Thomson
Chas E Harthan
BY
H. C. Townsend
ATTORNEY.

(No Model.) 9 Sheets—Sheet 5.

E. THOMSON & C. E. HARTHAN.
CHAIN MAKING MACHINE.

No. 512,848. Patented Jan. 16, 1894.

ATTEST:
J. A. Hurdle
W. H. Capel

INVENTORS
Elihu Thomson
Cha's E. Harthan

By H. C. Townsend
Attorney

THE NATIONAL LITHOGRAPHING COMPANY,
WASHINGTON, D. C.

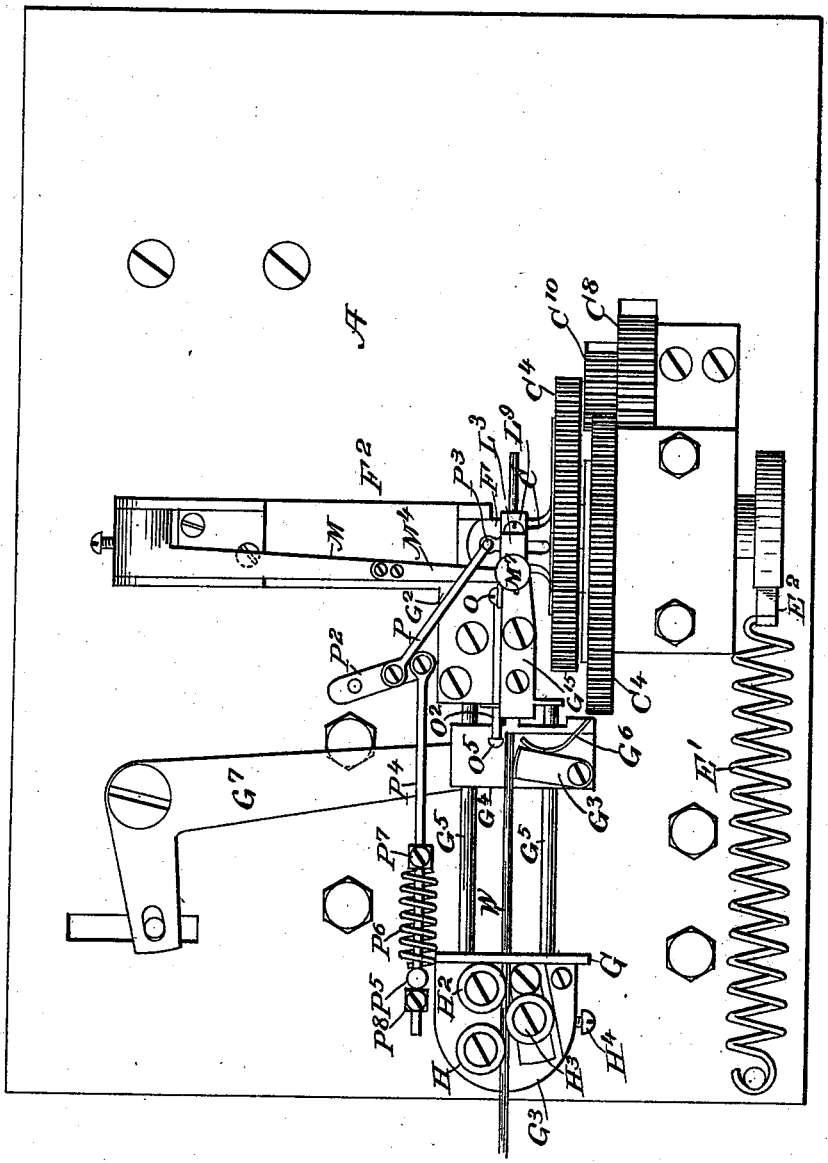

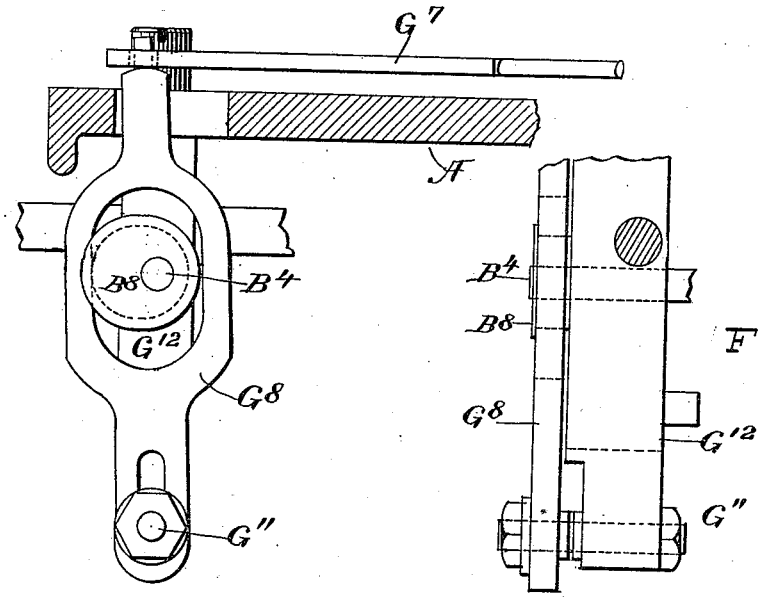
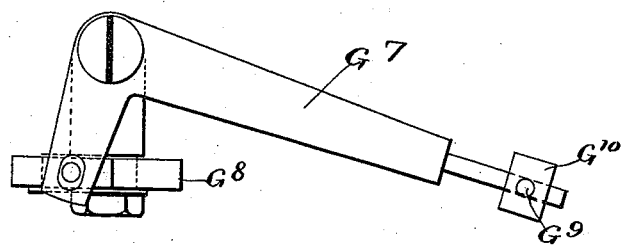
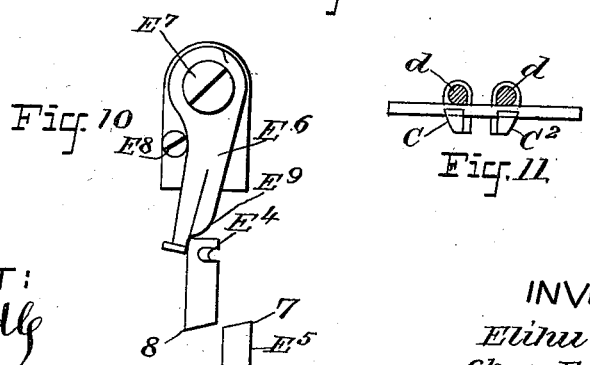

(No Model.) 9 Sheets—Sheet 8.

E. THOMSON & C. E. HARTHAN.
CHAIN MAKING MACHINE.

No. 512,848. Patented Jan. 16, 1894.

ATTEST:
J. A. Hurdle
[signature]

INVENTORS
Elihu Thomson
Chas. E. Harthan

By H. C. Townsend
Attorney (No Model.) 9 Sheets—Sheet 9.

E. THOMSON & C. E. HARTHAN.
CHAIN MAKING MACHINE.

No. 512,848. Patented Jan. 16, 1894.

WITNESSES:
J. A. Hundle
Wm H. Capel

INVENTORS
Elihu Thomson
Chas E. Harthan
BY
H. C. Townsend
ATTORNEY

UNITED STATES PATENT OFFICE.

ELIHU THOMSON, OF SWAMPSCOTT, AND CHARLES E. HARTHAN, OF LYNN, MASSACHUSETTS, ASSIGNORS TO THE THOMSON ELECTRIC WELDING COMPANY, OF MAINE.

CHAIN-MAKING MACHINE.

SPECIFICATION forming part of Letters Patent No. 512,848, dated January 16, 1894.

Application filed December 19, 1890. Serial No. 375,230. (No model.)

*To all whom it may concern:*

Be it known that we, ELIHU THOMSON, residing at Swampscott, and CHARLES E. HARTHAN, residing at Lynn, county of Essex, State of Massachusetts, have invented a certain new and useful Automatic Chain-Making Machine, of which the following is a specification.

Our invention relates to a machine designed to make chain from a continuous rod or coil of wire and to be entirely automatic in its operations.

The invention consists in the combinations of devices hereinafter described and claimed and combined and operating in the general manner hereinafter set forth.

The invention consists further in improvements in the details of construction of automatic chain making machines as hereinafter more particularly described and claimed.

The machine is so constructed that the material, in the form of wire, may be fed into it automatically and taken out in the form of chain, the construction being such that the operation is automatic in every respect and all the attention that is required being to oil the machine and keep it supplied with wire and removing occasionally the accumulated pile of formed chain. Adjustments for wear are made at proper points in the mechanism.

Figure 1:
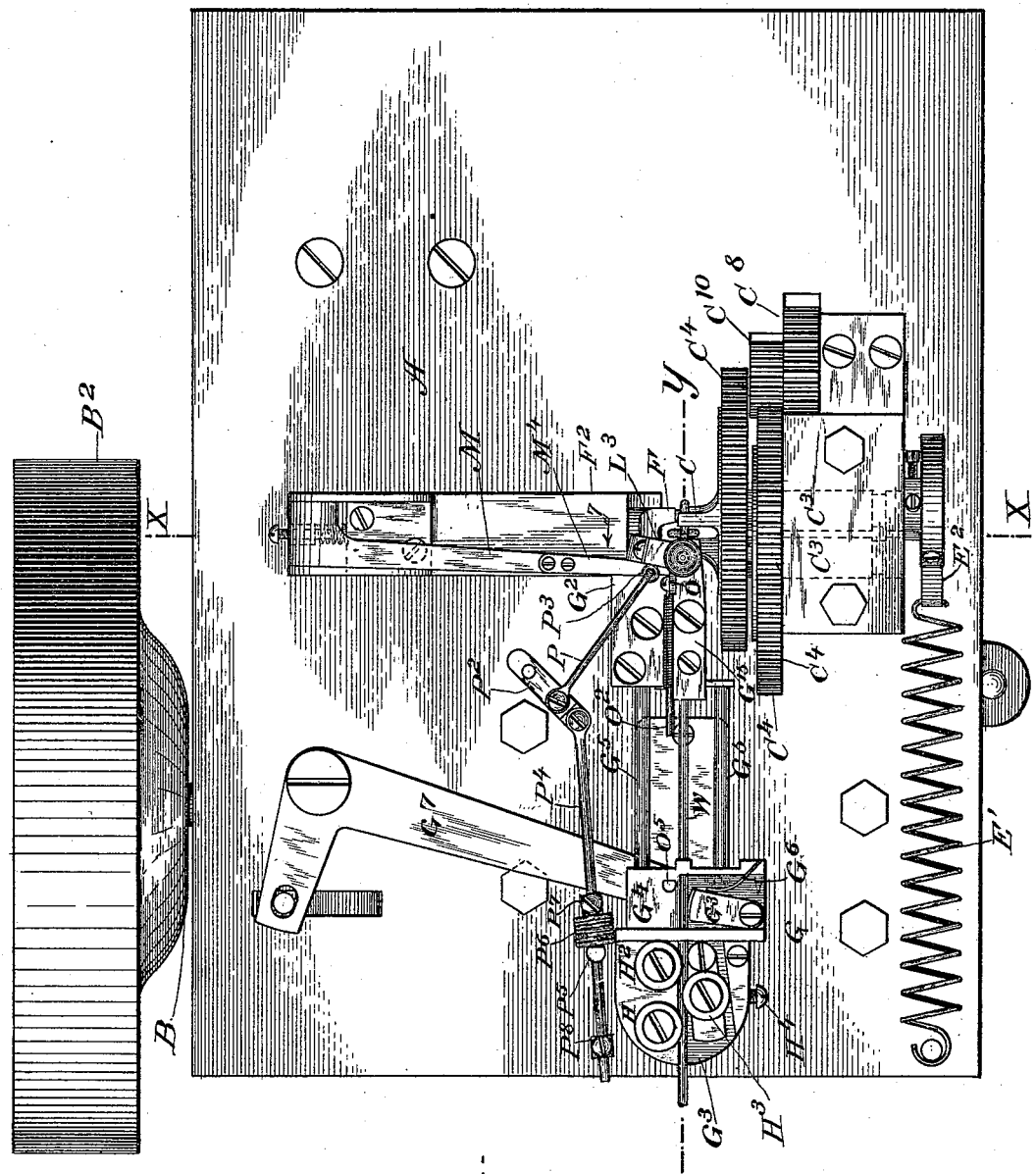
Figure 2:
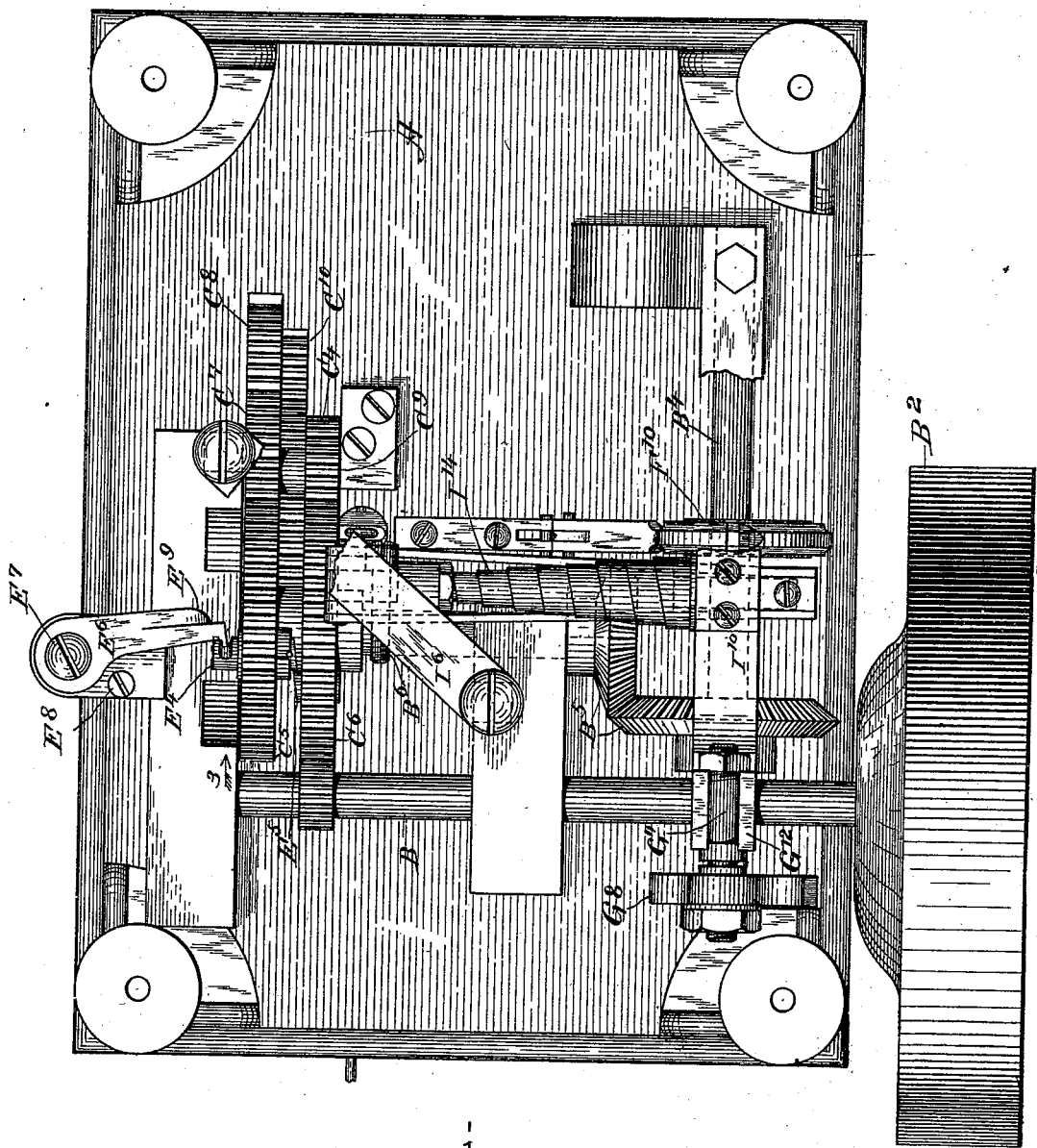
Figure 3:
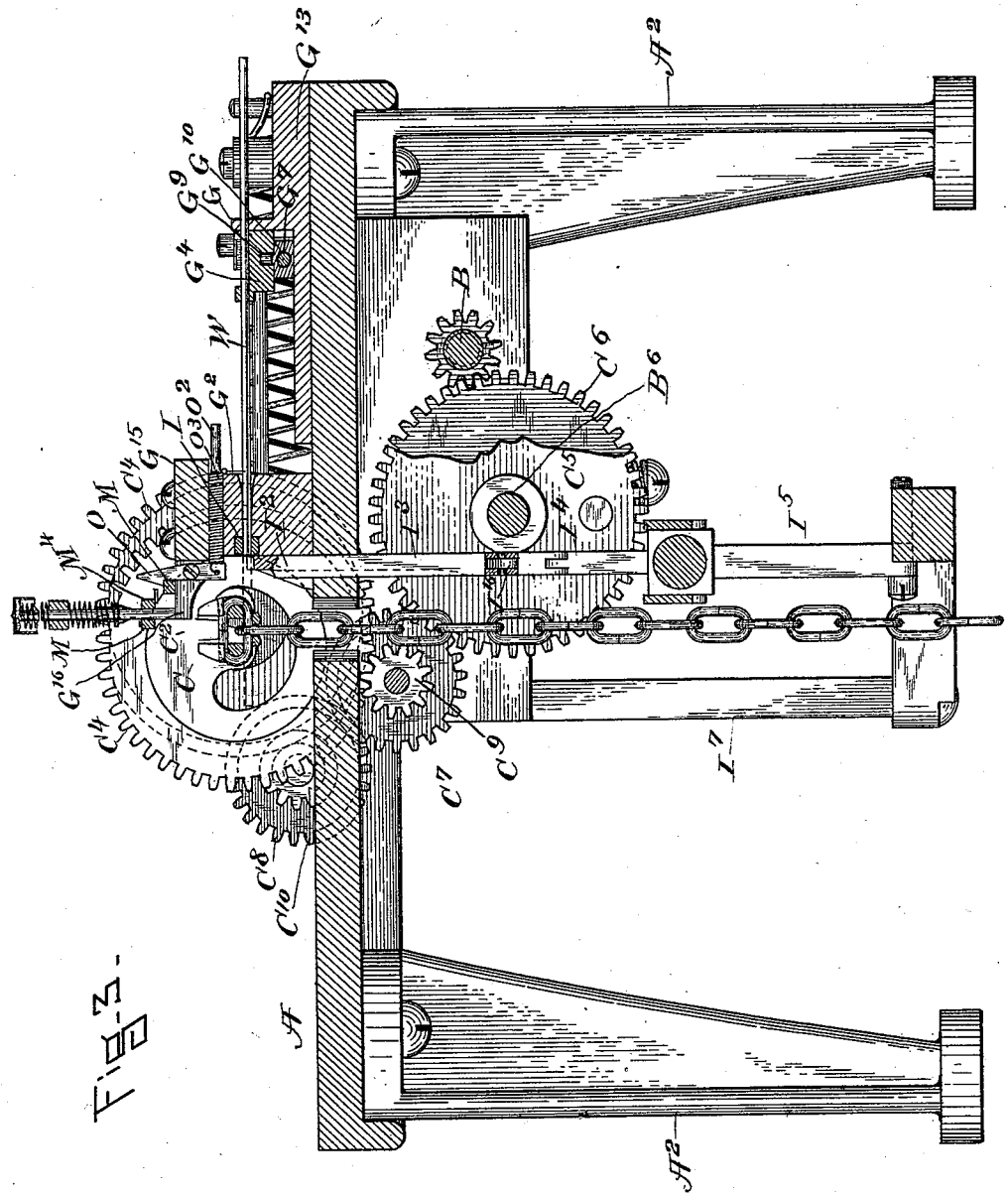
Figure 4:
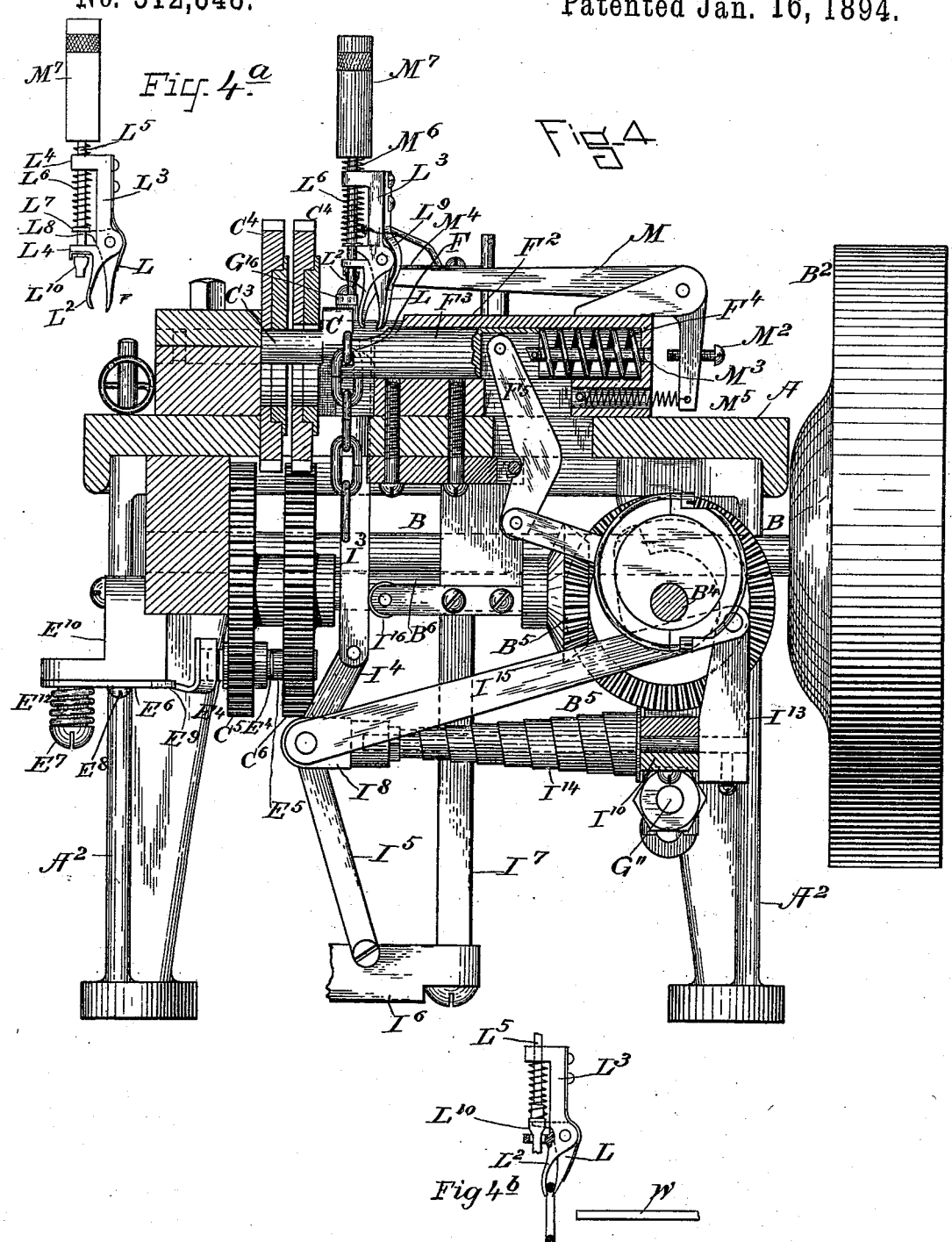
Figure 5:
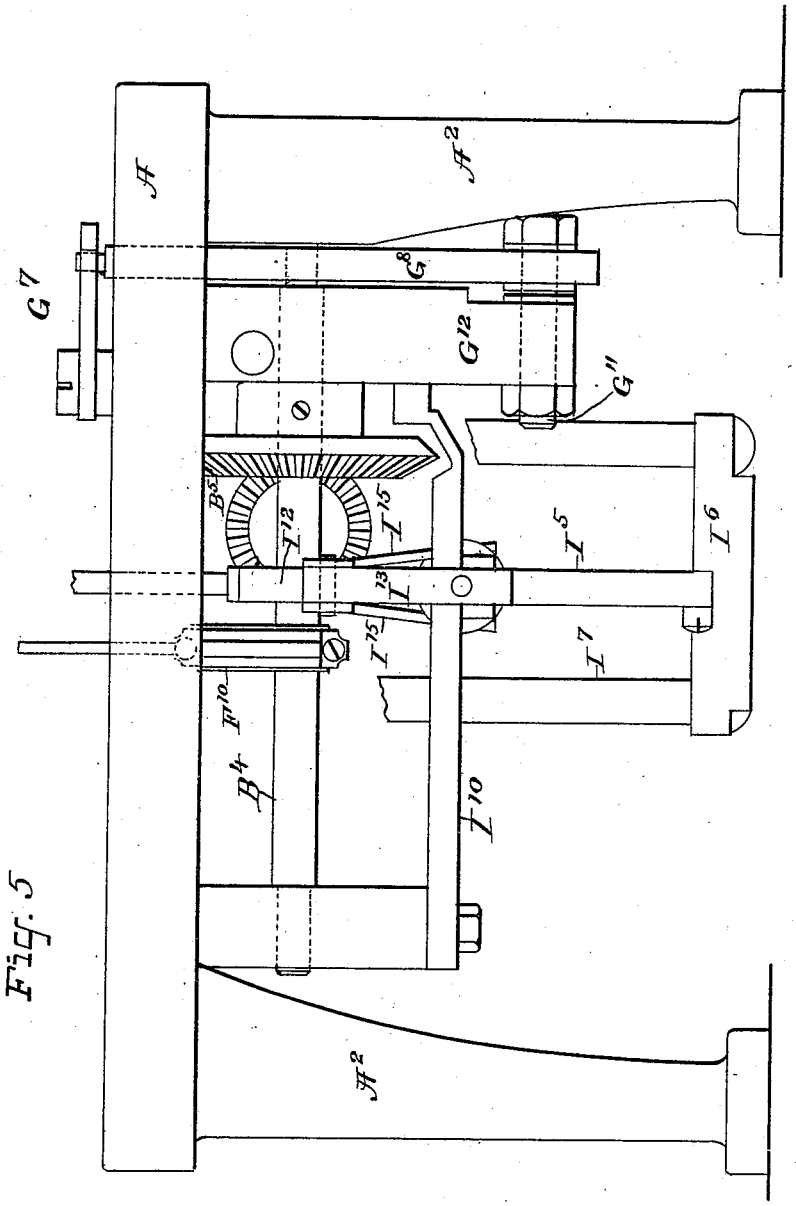
Figure 12:
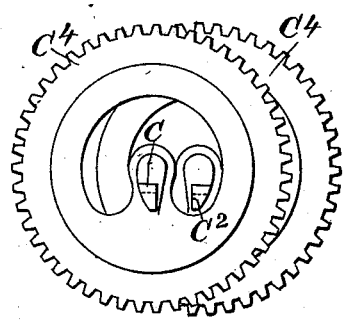
Figure 13:
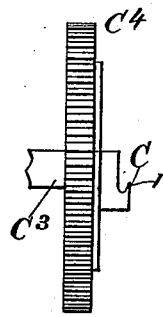
Figures 14, 15:
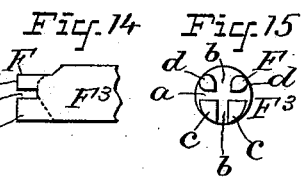
Figure 16:
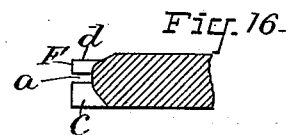
Figure 17:
Figure 18:
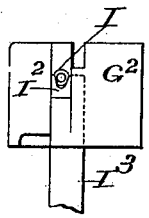
Figure 19:
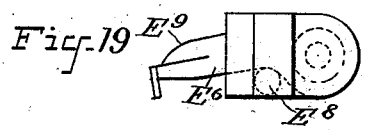
Figure 20:
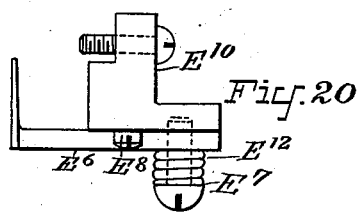
Figure 21:
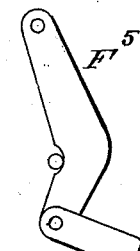
Figure 22:
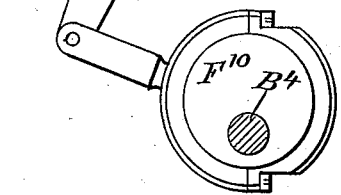
Figure 23:
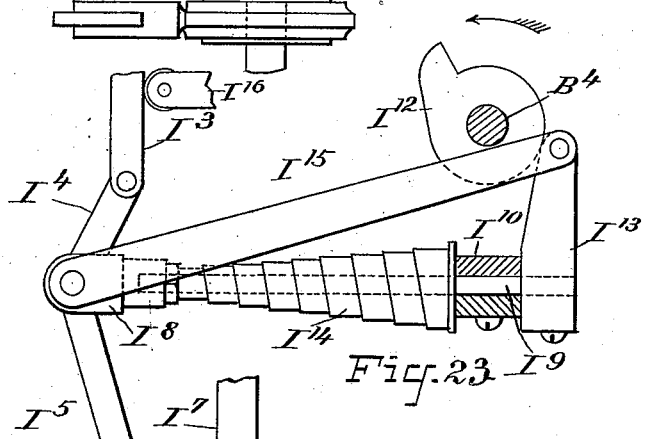
Figure 24:
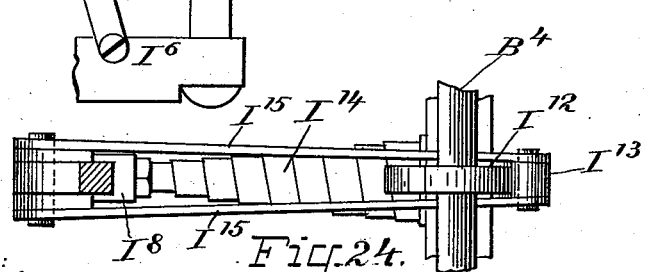

In the accompanying drawings:—Figure 1, is a plan view of a machine embodying our invention, and shows the feeding mechanism and devices actuated or controlled thereby for moving the link carrier in retracted position. Fig. 2, is an inverted plan view of the mechanism and shows the gearing, the automatic clutch mechanism, &c. Fig. 3 is a longitudinal vertical section through the machine taken on the line of movement of the wire fed into it. Fig. 4, is a vertical cross section through the machine on the line $x, x$, Fig. 1. Fig. $4^a$, is a detail side elevation of the link carrier raised. Fig. $4^b$, is a side elevation of the same depressed and swung around into position with a link supported by the hook or finger of the carrier in position to receive the blank from which the next link of the chain is made. Fig. 5 is an end elevation of the mechanism beneath the table taken from the end of the machine supporting the actuating devices for the former, the cutter and feed mechanism. Fig. 6, is a plan of the machine showing the position of the parts when the feed mechanism has completed its forward movement. Fig. 7, is a side elevation, and Fig. 8, an edge view of a part of the devices for actuating the feed mechanism. Fig. 9, is a plan of an intermediate lever connecting such actuating devices with the slide which carries the feed jaw. Fig. 10, is a plan of the trip devices for the clutch mechanism illustrating the same in a particular position. Fig. 11, illustrates the position is the formers and a cut-off blank from which a link is to be made with relation to the mandrel around which said blank is bent by the action of the formers. Fig. 12, is an end elevation of the formers and gear wheels which impart movement thereto in the position which they occupy when a blank or piece of wire is fed into position for making a link. Fig. 13, is an edge view of the gear and former. Fig. 14, is a plan, Fig. 15, an end view, and Fig. 16, a vertical section through the mandrel. Fig. 17, is a plan of the block through which the wire is bent, and the cutter working therein. Fig. 18, is an end view of said block, showing the opening through which the wire is fed, and the cutter bar. Fig. 19, is a plan of the trip hook used with the clutch mechanism. Fig. 20, is an edge view of the same detached from the machine. Fig. 21, is a side elevation of the actuating mechanism which reciprocates the mandrel. Fig. 22, is a plan of the same. Fig. 23, is a side elevation of the devices for actuating the cutter, detached from the machine. Fig. 24, is a plan of the same.

A, is a table or support from which the various parts of the mechanism are supported either above or beneath said table.

$A^2$, are the legs or standards upon which the table is mounted.

B, is any driving shaft provided with a pulley $B^2$. From this shaft motion is communicated through suitable intervening mechanism to the parts of the apparatus for the purpose of giving them the movements hereinafter described.

C, $C^2$, are two formers which are formed on or attached to parallel or overhanging shafts placed close together, as indicated in dotted lines, Fig. 1, at $C^3$. The shafts $C^3$, carry each a gear wheel $C^4$, by means of which each former is caused to rotate approximately half a circle around the ends of a mandrel F, for the purpose of forming the links of the chain into the desired shape. As the shafts are very close to each other the gear wheels are cut away, as indicated in Fig. 12, so that the overhanging ends of the shaft project through said gear wheels. These openings allow free rotary movement of the gear wheels in rotating the hooked ends of the formers. As only one-half a revolution is made ample stock is left in the gear wheels for support.

The preferred shape of the formers is more clearly seen in Figs. 12 and 13. Each is carried by a radial extension from the center of the shaft which at its end is provided with a horizontal projection that bears upon the wire in the operation of bending it. Preferably the horizontal extension or former proper is provided with a returning spur or hook 10, which prevents the wire from slipping off during the forming operation. The wheels $C^4$, are caused to revolve in opposite directions by means of a train of gears which receive motion from a wheel $C^5$, which is sleeved on a shaft $B^6$, and by means of an automatic clutch, as will be presently described, is periodically connected to a wheel $C^6$, fixed on shaft $B^6$, and geared to the driving shaft B, as shown in Fig. 3.

The intermediate gear between the wheels $C^5$, and $C^4$, consists of a wheel $C^7$, gearing to $C^5$, and carrying on its shaft a pinion $C^9$, which gears with one of the wheels $C^4$. The other wheel $C^4$, is rotated in the opposite direction by means of a wheel $C^8$, which gears with the wheel $C^7$, and is mounted on a shaft carrying a pinion $C^{10}$, gearing with said other wheel. The wheel $C^5$, is sleeved upon the shaft of the wheel $C^6$, so that the latter may rotate constantly in the same direction, while the wheel $C^5$, may be rotated first in one direction when clutched or connected with the wheel $C^6$, and then in the opposite direction when free from said wheel and acted upon by a suitable retracting device connected to the gears. Such a retracting device is shown in Fig. 1, as consisting of a spring $E'$, which is fastened at one end to the table while the other end is fastened to a strap $E^2$, which winds upon a wheel or drum fastened to or connected through gear with one end of the shafts $C^3$. By means of the power of the driving shaft B, the formers are moved in one direction to form the link and are returned to the starting position by means of the spring $E'$, which is put under increased tension by the winding of the strap upon its wheel as the shaft rotates in forming the link.

The wheels $C^5$, $C^6$, may be connected and disconnected by any automatic clutch. A device suitable for the purpose consists of a loose pin or stud $E^4$, working transversely in wheel $C^5$, and which is adapted to be engaged by a stud, shoulder or other part $E^5$, on the wheel $C^6$. The clutch pin $E^4$, is moved out of engagement with the stud $E^5$, by means of a trip-hook $E^6$, which is pivoted on a pin at $E^7$, and is adapted to engage with the notch (seen in Fig. 2,) in the pin $E^4$, so that as the latter moves around with its wheel and turns the hook on its center said hook, as it swings in the arc of a circle, will withdraw the pin from engagement with the stud $E^5$, when the formers have completed their movement in bending one blank into the desired shape. As soon as this disengagement takes place, the wheel $C^5$, is free to reverse its movement under the action of the spring $E'$, or other device and on such reverse movement, when it reaches the hook, will engage with the bevel $E^9$, on the back side of said hook and be forced back into position preparatory to the forming of a new link from which position it will be picked up by the stud $E^5$, after the wheel $C^6$, has completed a revolution.

$E^8$, is a stop pin to stop the movement of the hook $E^6$, and wheel $C^5$, on reverse movement when the pin $E^4$, engages with the cam or bevel $E^9$, on the back of the hook.

In the operation of forcing the pin or clutch $E^4$, back into position to be taken up by the stud $E^5$, the hook $E^6$, will be moved around into position against the pin $E^8$, where the end of the hook may take into the notch in the clutch pin when the wheel $C^5$, has been moved around a complete revolution by the wheel $C^6$.

The hook and locking pin are preferably made of hardened steel and the hook is also constructed to act as a cushion on the reverse movement of the wheel under the action of the retracting spring. For this purpose a stiff friction spring $E^{12}$, may be interposed between the head of the pin $E^7$, on which the hook is pivoted, and the hook itself.

$E^{10}$, is a bracket carrying the pivot pin $E^7$.

Any other construction of automatic clutch and trip mechanism adapted to disconnect and connect the driving mechanism at the proper time would serve the purpose but we prefer the particular construction shown.

Motion is communicated to the other parts to be presently described from a shaft $B^4$, mounted in suitable hangers beneath the table and driven by a bevel gearing $B^5$, one member of which is on shaft $B^4$, while the other is on a shaft $B^6$, to which the wheel $C^6$, receiving movement from shaft B, is fastened.

F, is a mandrel around which the formers work for the purpose of bending the wire into the shape desired for each link of the chain. This mandrel reciprocates in a suitable guide $F^2$, on the table and in a direction transverse to the plane in which the shaft of the formers turn. The mandrel has in this instance a shape adapted for an oval link. The end of the mandrel, as shown more clearly in the detail figure and in the plan view Fig. 1, has two cavities or depressions at right angles to one another, the longitudinal one of which, indicated at $a$, receives the blank or piece of wire which is to be shaped by the formers while the other, indicated at $b$, which divides the mandrel into two parts, is adapted to receive the last formed link edgewise while the blank constituting the next link of the chain is threaded through it. The projections $c, c$, beneath the longitudinal cavity or depression prevent the back of the blank from springing downward when the formers bend the free ends around over the outside of and down upon the top of the projections $d, d$, above the longitudinal groove or seat $a$. The vertical cavity or recess $b$, flares outwardly to guide the link edgewise into proper position in the vertical seat or rest, as the mandrel is moved up to position between the formers. The bevel or incline $e$, at the top of the slot $b$, clears the hook or finger of the carrier, to be presently described, which comes down to pick up a formed link and rotate it ninety degrees and into position to receive the end of the new blank. The mandrel $F$, is formed upon or carried by the end of a reciprocating block $F^3$, which after the formation of a link is drawn back into the guide $F^2$, through an opening which is not large enough to permit the link to pass and so constitute a stop or abutment that causes the link to slip off the end of the mandrel. At or about the time that the mandrel completes its backward movement away from the formers and into the guide $F^2$, the hook or finger of the carrier comes down to catch and support the formed link as it drops off the mandrel.

Suitable reciprocating movement is given to the slide $F^3$, by means of an eccentric $F^{10}$, and connections operated from the shaft $B^4$.

The eccentric and connecting lever $F^5$, which is joined at its upper end to the reciprocating slide carrying the mandrel, are shown clearly in detail in Figs. 21 and 22.

$F^4$, is a spring which assists the forward movement of the slide $F^3$, as it comes up to embrace the formed link which has been turned around edgewise for the threading of the wire $W$, through it.

The wire or material $W$, which is fed into the machine by suitable feed devices and is cut off into proper lengths for forming single links may be placed on a suitable reel near the machine in position so that the wire or material will unwind from the reel freely without kinking or bending as it is fed along. Any suitable feed device may be employed for the purpose, but we have herein illustrated a feed mechanism which has a reciprocating movement and which grips the wire to move it forward when the gripping clutch moves in one direction, said clutch, however, sliding freely over the wire when moved in the opposite direction.

$G^4$, indicates the body of the clutch or feeding mechanism. The body consists of a block of metal sliding on suitable guides $G^5$, which are mounted on blocks placed upon the top of the table $A$. The wire $W$, is guided through the clamp body $G^4$, and through suitable guide openings in a fixed plate or block $G$, and block or plate $G^2$, as seen in Figs. 1, 3 and 6.

$G^3$, is a movable clamp jaw which is pivoted on the movable block $G^4$, and is held against the wire by a spring $G^6$. The face of the jaw where it engages the wire may be serrated or provided with small teeth to prevent it from slipping over the same when moved in a direction to feed the wire. As will be seen the center or pivotal point of the jaw $G^3$, being back of the point of contact with the wire, the latter will be tightly clamped and carried forward with the feeding device when it is moved toward the mandrel and formers. As the feeding device, however, reverses its movement the wire is released inasmuch as the action of the pawl is to drag and loosen its hold as the device moves in a backward direction. To counteract the tendency of the wire to move backward with the feeding device, suitable friction wheels, which may be the wheels of a straightening device to be presently referred to, may be employed.

The feeding device may be reciprocated by means of a lever $G^7$, which is, as shown, a right angle lever pivoted at its angle upon the table $A$. The long arm of the lever $G^7$, is provided with an extension of uniform size upon which a block $G^{10}$, carrying a pin $G^9$, may slide. The pin $G^9$, engages with the body of the feeding and clamping device by taking into an opening on the under side of the same, as shown more clearly in Fig. 3. As the long arm of the lever $G^7$, moves backward and forward the block $G^{10}$, slides backward and forward on the end of the same and the pin $G^9$, turns in the clamp body $G^4$. By this means the parts may move freely without binding as the feeding device moves to and fro. The right angle lever is caused to oscillate by means of a vertical oscillating lever $G^8$, which is provided with a pin at its upper end taking into an elongated opening in the short arm of the horizontal lever $G^7$. The vertical lever receives movement from a cam $B^8$, on the shaft $B^4$, which cam works in an elongated vertical slot in the lever $G^8$, as shown more clearly in Figs. 7 and 8.

As the feeding device is required to move only at intervals and may remain at rest at other times a certain amount of lost motion may be provided between the eccentrics and the sides of the lever where it engages with the same, or at other points.

The vertical lever is pivoted upon a pin $G^{11}$, which is capable of vertical adjustment in a slot in the lower end of the hanger or support $G^{12}$. The lower end of the lever $G^8$, is also provided with an elongated slot where the pivot $G^{11}$, passes through it. By adjusting the position of the pivot vertically in the groove or slot in the hanger and in the lever $G^8$, the relative distances between the supported or pivotal point of the lever and the center of the eccentric shaft which operates said lever, with relation to the short arm of the lever $G^7$, may be changed or adjusted, thereby permitting more or less movement to be given to the feeding devices as desired. The pivotal point can be fixed at the desired position of adjustment by means of the lock nuts upon the ends of the pivot $G^{11}$.

If desired a straightening device may be used in connection with the wire or material fed into the machine. Such a device is shown in plan in Fig. 1, and consists of three grooved rollers H, $H^2$, $H^3$. Two of said rollers H, $H^2$, rotate on fixed bearings upon the block $G^{13}$, and alongside each other on one side of the wire while the third roller $H^3$, is mounted on a movable bearing which may be set or adjusted in position with relation to the wire by means of a set screw $H^4$, engaging with the movable block carrying said roller $H^3$. As the roller $H^3$, bears on the wire between the rollers H, $H^2$, the effect will be obviously to straighten the wire as it passes through the rolls. This device also operates as before mentioned in the manner of a friction device to prevent the wire from moving backward with the feeding mechanism.

In addition to the devices described a suitable cutter is provided for cutting off a proper length of the wire or material at the termination of each forward or feed movement thereof into position where the formers may bend it on the mandrel, the portion cut off being of proper length to form one of the links of the chain. A cutting device suitable for the purpose is herein shown as consisting of a stationary hardened steel bushing I, which is set into the blocks $G^2$, at the termination of the guide opening therein through which bushing the wire is fed. The hole in this bushing through which the wire passes should be plenty large enough for free passage thereof. Being set in as shown it can be readily removed for grinding.

A movable cutter or shear $I^2$, is properly guided in a vertical slot or guide formed in the block $G^2$, or otherwise provided, and is preferably arranged to cut the wire by means of a cutting edge at its top which engages with the lower side of the wire. This cutter has preferably a rounded notch through which the wire may pass when said cutter is in its lowest position but as the cutter is moved upward the bottom of the notch acts as a shear combined with the stationary bushing. This shear leaves the end of the wire cut nearly square, thus shaping the ends properly for the welding of the completed joint by the electric welding process without further preparation. The cutter $I^2$, is formed upon or attached to a vertically reciprocating guide $I^3$, guided as described and connected at its lower end with the upper member $I^4$, of a toggle joint mechanism. The lower end of the lower toggle lever $I^5$, is pivoted as shown on a step $I^6$, supported from a hanger or depending rod $I^7$, properly hung from the table. The toggle levers connect at the center of the toggle joint mechanism to a reciprocating block $I^8$, which reciprocates in a horizontal line and is attached to a rod $I^9$, which slides in a cross bar or support $I^{10}$, connecting the two hangers for the shaft $B^4$.

Movement is given to the block $I^8$, for the purpose of operating the toggle and raising the bar $I^3$, and cutter by means of a cam $I^{12}$, that is fixed to and rotates with the shaft $B^4$, and engages with a hardened steel shoe $I^{13}$, fixed to the end of the rod $I^9$. The shoe is held in constant engagement with the cam by means of a stiff sheet metal coil spring $I^{14}$, surrounding the rod $I^9$, and compressed between the cross piece $I^{10}$, and the head $I^8$, to which the toggle joint levers are connected. This spring returns the toggle joint to original position and in so doing lowers the cutter away from the cutter block I, so that the free movement of a fresh length of wire for forming a blank shall not be interfered with as the feed mechanism forces the wire through said block I. The cam is so shaped that the cutter moves upward and backward very quickly to cut off the wire, and will remain at rest for about three quarters of the revolution of the cam. The movement is so timed by suitable adjustment of the cam upon the shaft $B^4$, that the cutting action shall take place immediately after the termination of the forward or feed movement of the feed devices that move the wire through the block $I^2$, and into position over the former ends and in the horizontal slot $a$, at the end of the mandrel.

Suitable brace or tie rods $I^{15}$, may be used for connecting the upper end of the shoe $I^{13}$, with the head $I^8$, at the opposite end of the rod $I^9$.

$I^{16}$, is a friction roll which is mounted on a fixed arm extending from a solid stiff hanger and which serves to guide the lower end of the bar $I^3$, and prevent bending or distortion of the same under the pull of the mechanism which operates the toggle-joint devices.

While we have described one form of mechanism for operating a cutter at the termination of each feeding, we do not limit ourselves to such particular cutter or such special way of actuating the same as other forms of cutter and means for operating the same might be employed for cutting the wire at the termination of the feeding movement. We, however, prefer to employ the mechanism described.

The device for taking hold of a completed link as the mandrel moves back and carrying said link around into position for the threading through it of a new blank or piece to be formed into a link, may be constructed as follows:—The device which takes hold of the formed link consists of a movable finger or hook working alone, or preferably in conjunction with the opposite finger or hook $L^2$, fixed or movable. The hook or hooks are mounted in a movable support so as to be capable of a movement for the purpose of embracing the side of the formed link and of a horizontal movement through an arc of a circle for the purpose of carrying the said formed link to proper position and at the same time turning it around through an angle of ninety degrees so that the blank for the next link may be threaded through it. The finger $L^2$, may, for such purpose, be formed on or attached to the lower end of a sliding block or frame carrier $L^3$, which is provided with two lateral extensions that embrace and slide upon a vertical rod or support $L^5$. The support or guide $L^5$, and the parts of the carrier $L^3$, engaging therewith are so formed that the latter may turn around through an angle of ninety degrees on the guide or support. The jaw, hook or finger L, is pivoted upon $L^3$, and may move to and from the finger $L^2$, in the operation of taking hold of and releasing a link. The fingers are kept apart by the action of a spring $L^6$, which encircles the guide $L^5$, and is kept under compression between the upper extension $L^4$, and a freely sliding collar $L^7$, which engages with a heel or extension $L^8$, from the movable finger L. When said finger is relieved from the action of the spring $L^6$, it is moved toward the opposite finger $L^2$, so that the fingers are closed by the link by the action of a blade spring $L^9$, which is normally insufficient in power to overcome the spring $L^6$. The guide pin or standard $L^5$, may be mounted as indicated upon an extension $G^{16}$, from a block or support $G^{15}$, which is fastened upon the block $G^2$, and which supports the devices to be presently described. The movable finger is relieved from the action of the spring $L^6$, when the slide $L^3$, is lowered, by means of a stop conveniently provided by making a shoulder $L^{10}$, upon the guide $L^5$, with which shoulder the collar $L^7$, under spring $L^6$, engages when the parts are lowered sufficiently. The continued lowering movement after the engagement of the collar will permit the hook or finger L, to close and while the fingers or parts forming the carrier remain in such lowered position they may be turned by the devices to be presently described through an angle of ninety degrees, without having the fingers release the link. As the parts are raised the finger or hook L, will be opened or moved away when the slide $L^3$, rises to such a point that the heel of the movable finger L, engages the sleeve $L^7$, and brings said finger under the action of the spring $L^6$. The heel of the movable finger if guided upon the rod $L^5$, has an opening sufficiently large to permit it to pass the shoulder $L^{10}$, and that likewise the opening in the lower arm of the support or frame $L^3$, is large enough to pass up and down over said shoulder. The carrier as thus constructed to pick up the link and move it around to the proper position is sustained and raised and lowered by means of a suitable movable support or arm, herein shown as a lever M, which is hung from a bracket attached to the block $F^2$, or to other suitable support and has a vertical depending arm carrying an adjustable screw $M^2$, which is in position to be engaged by a rearward extension consisting of a rod or other piece $M^3$, that is attached to and moves with the mandrel block $F^3$, or is actuated at the proper time by any other part whose movement is such as to actuate the lever on the rearward movement of the mandrel as herein described. These parts are so adjusted and arranged that as the mandrel nears the end of its rearward movement carrying the link with it, the lever M, will be swung in a vertical plane to lower the frame or carrier body $L^3$, the latter being at such time swung around into the position indicated in Fig. 1, where the finger may come down over the two sides of the upper edge of the link just as the latter is slipped off the end of the mandrel. The carrier block or frame $L^3$, is supported by means of a flat spring $M^4$, attached to lever M, and rests freely upon the flat upper surface of said spring by means of the lower guide arm extending to and embracing the guide support $L^5$. The carrier devices are held in elevated position when the lever M, is not engaged by the mandrel block by means of a spring $M^5$, which is attached as shown to the arm carrying the screw $M^2$. The spring $M^6$, bears upon the top of the guide block $L^3$, and is kept under tension against said block $L^3$, by means of a nut $M^7$, upon the top of the guide pin or standard $L^5$. The spring $M^5$, is normally superior to the spring $M^6$, so as to hold the frame $L^3$, normally in elevated position but when the lever M, is lowered forcibly by the rearward movement of the block $F^3$, the spring $M^6$, forces the carrier downward until finally, after engagement of the collar $L^7$, with the shoulder $L^{10}$, the two fingers are closed around the link. The bevel or incline before referred to at the top of the vertical slot $b$, in the mandrel may receive and guide the movable finger or hook L, as the same is lowered and so assist in bringing the fingers together around the upper side of the formed link at the proper time. After the link has been grasped by the finger or fingers in the manner described and before the return movement of the mandrel, the carrier $L^3$, for the fingers, is swung around through an angle of ninety degrees, from the position indicated in Fig. 1, to the position indicated in Fig. 6, where it will support the link in position with relation to the end of the wire W, as indicated in Fig. $4^b$. During such rotary movement in a horizontal line and until the new blank is threaded through the previously formed link, the carrying devices and horizontal arm of lever M, are held in depressed position although the mandrel carrier $F^3$, may have become disengaged from the lever M, and begun its reverse movement. A device suitable for this purpose consists of a latch or catch O, which is pivoted on the block $G^{15}$, and in position to engage and hold down the end of the lever M, as indicated in Fig. 3, when such lever has been depressed for the purpose of lowering the hook or finger to take hold of the formed link. The catch is held in proper position to engage the link by means of a spring $O^3$, which lies in an opening in the block $G^{15}$, and surrounds a trip rod $O^2$, working through such opening and connected at one end to the catch lever O. The spring $O^3$, is connected at one end to the catch lever and at the other end engages with the opposite side of the block $G^{15}$, so as to be kept under tension. The trip rod $O^2$, releases the catch O, and allows the lever or support M, to spring up and carry with it the fingers after the new link blank has been threaded through the previously formed link as will be presently described.

Swinging movement in a horizontal plane is given to the link carrying devices by means of a rod P, which is pivoted at one end to a lever $P^2$, mounted on the table A, and at the other end takes into an eye or projection $P^3$, upon the slide $L^3$, supporting the fingers. Movement is communicated to the lever $P^2$, and rod P, by means of a reciprocating rod $P^4$, which works through a rotary guide pin or bearing $P^5$, upon the table A, and is actuated in one direction by a spring $P^6$, surrounding rod $P^4$, and held between bearing $P^5$, and an adjustable pin, collar or projection $P^7$, upon said rod. The collar or projection $P^7$, engages with the lever $G^7$, which actuates the feed devices so that as the latter move forward the rod $P^4$, may move under the action of the spring $P^6$, and turn the carrying devices with the link. An adjustable stop collar $P^8$, engages with bearing $P^5$, to limit the movement of the rod $P^4$. The reverse movement of the carrier block $L^3$, in a horizontal plane around to position where it may be lowered to cause the hook L, to take the link is produced by the positive action of the lever $G^7$, as it moves the feed mechanism back to the position shown in Fig. 1. It will be observed that by this construction of devices for swinging the carrier $L^3$, the feed mechanism is permitted to move forward after the carrier has been swung around to proper position and to complete the movement necessary for completing the threading of the wire or blank completely through the link. Thus as the feed mechanism starts from its extreme retracted position the carrier $L^3$, under the influence of spring $P^6$, turns as the mechanism moves up until it reaches the proper position at which time the movement is stopped by the collar $P^8$. At this instant the link will have been swung to position to receive the end of the wire moved forward by the feeding mechanism and any further swinging movement would obviously carry it out of position. As, however, the lever $G^7$, is not positively engaged with the actuating devices for swinging the carrier $L^3$, during forward movement of said lever, the carrier may come to rest and the lever may continue its forward movement for the purpose just explained. The backward movement of the feed mechanism when it reaches the proper point, produces a backward swing of the carrier by positive action in obvious manner.

The trip rod $O^2$, is operated for the purpose of releasing the lever M, by means of the pin or stud $O^5$, which moves with the feed devices, is mounted on the block $G^4$, and engages the rod $O^2$, to release the lever M, after the end of the wire from which the new link is to be formed has entered the previously formed link so that the latter may be freed from the fingers without dropping out of position. When the catch is so operated and the lever M, is relieved, the spring $M^5$, will lift the hook or finger causing it to open and free the link which will now drop down and be supported upon the wire which has been fed through into position over the formers. After the fingers have been raised and freed from the link by the tripping action described, the reverse movement in a horizontal plane into position where they may be lowered to pick up the link after it has been formed is produced on the reverse movement of the feed mechanism.

It is obvious that the tripping action may be arranged to take place at any time after the wire has been fully fed through the previously formed link. It will also be apparent that the latch might be tripped by a dog or detent $O^5$, moved by any other part of the mechanism or driving devices and having a proper movement timed so as to relieve the lever M, at the stage in the operation already explained. In the same way the swinging movement of the carrier $L^3$, might be produced by any other part having the properly timed movement in the operation.

The general operation of the apparatus is as follows:—In Fig. 12, the formers are shown in position just before they have completed the movement required for the bending of any link into shape upon the mandrel. The trip devices for the clutch, which just before the completion of the movement will be in the position indicated in Fig. 2, will at the termination of such movement have been carried along to position where the two wheels $C^6$, $C^5$, will have been disconnected, the pin $E^4$, having been drawn outward. The result of this is, as before explained, that the wheel $C^5$, which, during the movement of the former in shaping the link, was moving in the direction of the arrow 3, Fig. 2, will immediately reverse its movement under the operation of the spring $E'$, and will be carried back a whole revolution striking the lever $E^6$, on its reverse side, and the parts will now be in the position indicated in Fig. 10, the projection upon the constantly revolving wheel $C^6$, being at such time beyond the point where, on continuation of its movement in the same direction, it may engage with the clutch pin. A complete revolution of such wheel will be, therefore, required before the two wheels may be again engaged by impingement of the edge 7, of the pin $E^5$, upon the corner or edge 8, of the pin $E^4$, and during such revolution the formed link may be taken off the mandrel, placed in position and a new blank fed through and cut off. In the reversal of movement of the wheel $C^5$, the former will have been carried back to the position indicated in Figs. 11 and 12. The clutch mechanism being in the condition indicated in Fig. 10, the mandrel will be still projected with the formed link upon it, the feeding devices will be retracted into the position indicated in Fig. 1, ready to feed a new length of material into position to be cut off and formed, and the carrier which picks up the formed link will have its fingers raised and opened and in position as indicated in Figs. 1 and 4, over the mandrel, ready to be lowered and so pick up the link which has been formed when the latter has been carried back by the mandrel toward the recess or opening into which the mandrel block is withdrawn. As the wheel $C^6$, continues its movement from the position of the part $E^5$ indicated in Fig. 10, the various mechanisms under the action of the driving devices which move with said wheels will take on movements substantially as follows, the forming devices being meanwhile stationary because the wheel $C^5$, is at rest. The mandrel under the influence of the eccentric before described will begin to move back into its guide and as it approaches the extreme of its rearward movement the lever M, will be lowered, thereby lowering the hooks or fingers so that the hook L, may take hold of the formed link as before described, the lever itself being at the same time caught and held down by the latch or catch O. The movement of the lever M, downward is so timed that by the time the mandrel is fully withdrawn and the link freed therefrom, the finger L, will have moved under the upper side of the formed link and as the latter drops off the mandrel the weight of the chain already formed will pull the link down so that it will be supported from one of its smaller ends.

The feed devices which in the meantime have remained stationary through the provision of the lost motion now begins to move forward carrying the wire W, with them thus feeding a fresh length of wire into position over the hooked ends of the formers while the same occupy the position shown in Fig. 11, as illustrated in that figure. At the same time or as soon as the feed mechanism begins to move the support or carrier $L^3$, carrying the fingers and link will be swung around through the links and connection already described into the position indicated in Figs. 6, and $4^b$, the movement being so timed that the link will reach the position shown before the end of the wire under the action of the feed mechanism shall have reached the point intermediate of the two formers where the link through which it is to be threaded is located. With this forward movement of the feeding devices the mandrel will begin to move back to position and at or about the completion of the feed movement will have been projected to its full extent so that when the necessary length of wire has been fed forward the wire will lie in the horizontal groove $a$, in the former and threaded through the link which has been swung around by the carrier into position where the mandrel will receive it in the vertical groove edgewise.

To permit the full movement of the formed link into proper position to enter the vertical groove in the mandrel, it is desirable to cause the swinging movement of the carrier $L^3$, under the influence of the feeding mechanism or such other part as may move therewith, to slightly precede the forward or projecting movement of the mandrel. After the full forward movement of the feed mechanism and the movement of the mandrel so that the wire will be under the mandrel projections $d$, $d$, the cutter will operate with a quick movement and cut off the proper length and at some time in the forward movement of the feed mechanism, but subsequently to the threading of the end of the wire through the link, the catch O, will have been operated so that the fingers will be raised and disengaged from said link ready to be swung around to position to pick up the link about to be formed, such swinging movement being produced through the reverse movement of the feeding mechanism through the devices before described. During the operations described the wheel $C^6$, will have been making its revolution toward the point where it will pick up the wheel $C^5$, so that by the time the proper length of wire has been fed into position and the mandrel has been brought also into proper position the formers will begin to move around in arcs of circles around the ends of the projections $d$, $d$, which constitute the formers proper for the purpose of bending the length of wire fed into the machine into proper shape.

While we have described the cutting operation as taking place previous to the time that the formers begin to move, it is obviously not necessary that the blank should be cut off until after the formers begin to move, since the action of the cutter is in an upward direction and it tends to bend the wire or blank in the same direction as the former nearest the cutter. Before the formers complete their movement the operation of the mechanism acting upon the feeding devices will begin to take place in a manner to reverse the movement of the latter into their extreme reverse position ready for feeding a new length of material into place which position the parts will reach before the formers are completely freed from the operation of the wheel $C^6$, acting through the wheel $C^5$. As the feeding mechanism is retracted it swings the fingers around in the direction of the arrow 7, Fig. 1, so as to bring them into position for coming down over the link when the material is retracted as just explained. When the formers have completed their movement they will be released as already described, the parts connected with the wheels $C^5$, $C^6$, will assume the position indicated in Fig. 10, and the operation of retracting the mandrel, depressing the fingers to catch the link, feeding in a new blank, and swinging the formed link around into position for the threading operation, accompanied by the projection of the mandrel and the operation of the cutters and formers, will be repeated.

While we have described the devices which lower or move the carriers or fingers so as to cause them to pick up the link as being produced by the action of the carrier or slide upon which the mandrel is mounted, it is obvious that the desired movement may be produced by a cam or other device connected to the driving mechanism and timed to lower the carrier or block $L^3$, for the hook or finger at the proper time, as already described, when the mandrel is being retracted or has about completed its movement of retraction. In the same manner we do not limit ourselves to moving the carrier $L^3$, with the link by the special devices described that move with the feeding mechanism, as the connections which swing the carrier with the link might be operated upon by some other part of the moving mechanism or parts operated by the driving mechanism and given the properly timed movement to carry the link around in season for the threading of the end of the wire through it. It is obvious likewise that the catch which holds the carrier or support for the same down might be released by some other part of the mechanism timed to act on it after the threading operation has been effected. We prefer, however, for the sake of simplicity, to move this part of the devices by the particular means hereinbefore described.

We prefer to employ a spring for retracting the formers after they are disconnected from the driving mechanism, but do not limit ourselves to a spring, as any other retracting or reversing power might be employed without departing from our invention, for moving said formers when freed from the positive driving mechanism.

We have described the operation of the mandrel when projected as taking place after the wire has been threaded through the link, but it would be obviously within our invention to project the mandrel in time to have the wire threaded through the longitudinal opening $a$, in the end thereof instead of having it come up to take the wire after the latter has been fed sufficiently to have its end opposite said longitudinal opening or depression. It would, however, obviously be necessary in such case that the horizontal movement of the carrier to bring the link around into position should precede the movement of the mandrel so that the link could be received in the vertical slot or opening $b$, edgewise. The horizontal movement or movements of translation of such carrier with the formed link would obviously also, in such case, have to precede the movement of the feeding mechanism. The arrangement already described, however, is preferable on the score of rapidity of operation.

While we have described a machine in which two formers will be used, it will be obvious that many of the devices and combinations of mechanism described and claimed would be adapted for use in a machine in which a greater or less number of formers should be employed.

While we have described the movement of each of the various parts as taking place at a certain time with relation to the movement of other parts it will be well understood that variations in the relative times of movement may exist without changing the general operation of the apparatus, and we do not therefore, wish to be understood as limiting ourselves to arranging or adjusting the actuating devices to move the elements of the apparatus at just the times stated.

What we claim as our invention is—

1. The combination in a chain making machine, of two formers carried by oscillating rock shafts mounted on fixed bearings, said formers being adapted to rotate in opposite directions and in arcs of circles, and a mandrel reciprocating to and from the formers in line with their axis of rotation.

2. In a chain making machine, the combination with the mandrel, of two revolving formers upon the ends of overhanging driven shafts, and gear wheels attached to said shafts and cut away as described to permit rotation of the shafts and formers.

3. The combination in a chain making machine, of two revolving formers mounted upon oppositely rotating shafts or spindles, a driving shaft, an intermediate clutch for connecting and disconnecting the said formers from the driving power, and a retractor connected to the formers for returning the same to position of rest when the clutch is disconnected.

4. The combination in a chain making machine, of a pair of formers mounted upon suitable rock shafts placed side by side, a mandrel reciprocating to and from the formers in line with said shafts, a continuously revolving driving shaft, an automatic clutch for connecting and disconnecting the said rock shaft from the revolving driving shaft, and a retractor connected to the rock shafts carrying the formers for swinging the same back through an arc of a circle after the link is formed.

5. The combination in a chain making machine with the reciprocatory former, of a continuously revolving actuating wheel, a sliding clutch-pin carried by a reciprocating wheel connected to the former, and a disengaging hook or trip with which the said pin connects when the former completes its movement in shaping a link.

6. In a chain making machine, the combination with a wheel connected to a rotary reciprocating former, of a clutch pin carried by said wheel, a pivoted hook for catching the pin and disengaging it from the driving shaft or wheel, and a cam or bevel on the back side of the hook for forcing the pin into position to be taken up by the driving wheel or shaft on the completion of a revolution.

7. The combination in a chain making machine, of two rotary reciprocating formers, a driving shaft, intermediate gear for rotating said formers in opposite directions, an intermediate clutch composed of a sliding pin on a wheel constantly connected to the formers and adapted to be engaged and disengaged from a wheel revolving constantly in the same direction under the action of the driving shaft, a trip hook or lever for moving the pin backward and forward in its wheel, and a retractor connected with the wheel carrying said pin for reversing the movement of said wheel and the formers, as and for the purpose described.

8. In a chain making machine, the combination with a reciprocating former and wheel constantly connected therewith, of a sliding clutch pin carried by such wheel, a pivoted stop lever with which said pin engages on reverse movement of its wheel, and a friction spring bearing on the stop lever whereby it may have a cushioning effect or reversal of the wheel and former.

9. The combination in a chain making machine, of two wheels $C^5$, $C^6$, the constantly revolving shaft carrying one of said wheels as $C^6$, and provided with a stud or projection, a sliding clutch pin $E^4$, working through the wheel $C^5$, a pivoted lever $E^6$, carrying a hook adapted to be engaged by said pin for the purpose of disengaging or disconnecting the wheel and provided with a bevel or cam on its back-side for forcing the pin into position for reengagement when the wheel carrying said pin completes a reverse revolution, two rotary reciprocating formers, intermediate gear between the same and the wheels $C^5$, whereby said formers may be moved thereby in opposite directions, and a retractor connected with said wheel and formers whereby the movement of the parts may be reversed when they are disconnected from the driving power.

10. In a chain making machine, the combination with the wheels $C^5$, $C^6$, connected respectively to the former and to the driving power, of a clutch pin carried by one of said wheels, and a tripping or resetting hook or lever $E^6$, whereby said pin may be moved in one direction for disconnecting the two wheels when it engages with the hook on one side thereof, and may be forced in the opposite direction for re-engagement by the driving wheel when it strikes the opposite side of the hook.

11. In a chain making machine, the combination with a clutch pin and the wheels $C^5$, $C^6$, of a hook $E^6$, and a friction spring $E^{12}$, as and for the purpose described.

12. The combination with the two formers carried on overhanging shafts, of the cutaway gear wheels mounted on said shafts, gear connected to said wheels for rotating the shafts in opposite directions, a spring terminating in a strap adapted to be wound upon a wheel connected to said gear, a driving shaft for rotating the gear which moves the formers in opposite directions, and an automatic clutch for connecting and disconnecting the gear with the said driving power.

13. In a chain making machine, the combination with a mandrel, of the parallel rock shafts or spindles having bearings mounted in line with said mandrel, and a pair of formers C, $C^2$, carried by said shafts and adapted to rotate or reciprocate in arcs of circles and in opposite directions around said mandrel from one side thereof through substantially an arc of ninety degrees to the opposite side.

14. The combination in a chain making machine, of two rock shafts or spindles, a mandrel adapted to reciprocate in line with them, and formers attached to radial arms or extensions of said shafts and having the rectangular longitudinal projections described to constitute former jaws or hooks.

15. In a chain making machine, a mandrel having a recess or division A, transverse to the line of feed of the blanks, and adapted to receive a formed link edgewise, in combination with means for feeding the blank endwise through the link while the latter is held in the said recess.

16. In a chain making machine, a mandrel having two recesses or depressions in its end at right angles to one another, one adapted to receive a formed link and the other to receive the blank, in combination with means for feeding the blank endwise through the latter recess while the link is suspended with its opening in line therewith, as and for the purpose described.

17. In a chain making machine, a mandrel having two recesses or depressions in its end at right angles to one another, one adapted to receive a formed link and the other to receive the blank, as and for the purpose described.

18. In a chain making machine, a mandrel having projections $c, c$, adapted to prevent the back of the link from springing outward in the forming operation.

19. In a chain making machine, a reciprocating mandrel having a slot or depression at right angles to the line of the blank, and beveled or inclined at its upper end where the carrier hook enters, as and for the purpose described.

20. In a chain making machine, a reciprocating mandrel having a depression $b$, at its end flaring outward to receive a formed link edgewise.

21. In a chain making machine, the combination with a horizontal reciprocating mandrel working through an opening insufficient to pass the formed link, of a reciprocating finger or pick up mounted to move vertically over the mandrel and adapted to take the formed link from the mandrel as the latter recedes.

22. The combination in a chain making machine, of a reciprocating mandrel, a former, and a finger or pick-up mounted on a guided support adapted to slide at right angles to the line of motion of the mandrel and to rotate or swing in a plane at right angles to its sliding movement and sufficiently to turn the link through an angle of substantially ninety degrees.

23. In a chain making machine, the combination with a reciprocating mandrel, of a pick-up finger or carrier, a sliding and rotary support therefor, actuating devices for moving said support and finger into position to take up the formed link as the mandrel moves back, and mechanism for swinging or rotating the support through a proper angle after the link is caught so as to turn the link around into position to permit the blank from which the next link of the chain is formed, to be threaded through it.

24. In a chain making machine, the combination of a reciprocating mandrel, a hook or finger for picking up the formed link as the mandrel leaves it, a slide supporting said finger and adapted to rotate or turn at right angles to its sliding movement, an arm or lever supporting said slide, and a catch for holding said lever depressed during rotary movement of the slide and finger, and a detent for operating said catch, as and for the purpose described.

25. In a chain making machine, the combination of a reciprocating mandrel, a vertically movable and horizontally turning block or carrier $L^3$, mounted over the same, of a hook or finger attached to said block for taking a formed link as it leaves the mandrel and swinging it around into position to receive a blank, and a vertically movable support for said carrier, engaged by the mandrel or a part moving with the same, as and for the purpose described.

26. The combination in a chain making machine, of a reciprocating mandrel, a vertically movable and horizontally turning carrier, frame or support $L^3$, a hook or finger mounted thereon for engaging and supporting a formed link as it leaves the mandrel on backward movement of the latter, a support for said block or carrier, means for lowering the same on the backward movement of the mandrel, a hook or catch for holding the same depressed, mechanism for turning the block or carrier after the formed link has been seized, and a detent for operating the catch or latch to disengage the lever after the link has been swung around by means of the carrier through approximately ninety degrees and a new blank has been threaded through it.

27. The combination in a chain making machine, of a vertically sliding carrier, frame or support $L^3$, supporting a hook or finger for engaging with the formed link, a reciprocating mandrel, a vertically moving lever engaged thereby or by a part moving with the same, a spring attached to said lever and supporting the sliding block or carrier, and a catch for engaging and holding the lever depressed during the turning movement of the said carrier with the formed link.

28. The combination, substantially as described, in a chain making machine, of a horizontally reciprocating mandrel, a former or formers, a feed mechanism for feeding the material step by step, a vertically sliding carrier, frame or support $L^3$, adapted to turn horizontally through approximately an angle of ninety degrees, a hook or finger carried thereby for supporting a formed link and turning it into position to have the blank of the next link threaded through it, a vertically moving support for the carrier frame engaged by the mandrel, or a part moving with it on the backward movement of said mandrel with the formed link for the purpose of lowering the frame carrying the hook or finger, to take the link off the mandrel, and an intermediate mechanism between the carrier frame and the feed mechanism whereby said carrier may be turned or swung, as and for the purpose described.

29. The combination in a chain making machine, of a reciprocating mandrel, an arm or support M, which is engaged by the mandrel or a part moving with the same on backward movement of the mandrel with a formed link, a block or carrier supported upon the arm and adapted to rotate through an angle of approximately ninety degrees, a hook or finger for taking hold of a formed link carried by said block, a catch for holding the arm down, a feed mechanism for feeding the blank material into position, intermediate devices between said feed mechanism, and the rotary carrier or block for rotating the same after a link has been engaged by the hook, and a detent pin or dog moving with said feed mechanism for releasing the vertically moving arm after the block or support $L^3$, has been swung around to position to permit the blank to be fed through the link.

30. The combination in a chain making machine, of a horizontally reciprocating mandrel, a vertically reciprocating block or frame $L^3$, a guide pin or standard upon which the same may turn, an arm or lever M, carrying or supporting said block or frame and engaged by a rearward extension from the mandrel, a pivoted finger or hook L, pivoted on the frame or block $L^8$, a catch for holding the arm M, depressed, a link or mechanical connection for turning the frame $L^3$, and means for releasing the catch after the frame has been turned, as and for the purpose described.

31. The combination in a chain making machine, of a sliding reciprocatory mandrel, a block or frame $L^3$, sliding at right angles to the mandrel upon a suitable guide or guides, and carrying a movable hook or finger, an arm or support for said block or frame, mechanism for lowering the same on the rearward movement of the mandrel, a catch for holding the same depressed, means for turning the block or frame supporting the hook or finger after the support M, has been lowered, and a dog or detent for releasing the catch after the turning of the frame or block.

32. The combination in a chain making machine, of a reciprocating mandrel, an arm or support M, engaged by a rearward extension of said mandrel, or a part moving with the same, a suitable frame or block $L^3$, mounted upon a vertical spindle upon which it may slide and turn, a hook or finger carried by said block or frame, two springs acting on said hook or finger and tending to move the same in opposite directions, one of said springs being stronger than the other and serving to hold the finger normally open, and a stop for relieving the finger from the action of said stronger spring when the frame upon which it is mounted is lowered.

33. In a chain making machine, the combination, substantially as described, of a reciprocating mandrel, a sliding block or frame carrying a pivoted hook, an arm or support upon which said block or frame is sustained, a spring tending to depress the block, a second spring tending to raise the supporting arm and block or frame, and an actuating pin or projection moving with the mandrel for lowering the arm so that the spring acting upon the block or carrier supporting the finger may be lowered.

34. The combination in a chain making machine, of a mandrel, a slide $F^3$, carrying said mandrel, an actuating shaft and cam for reciprocating the mandrel, an arm or lever M, engaged by a rearward extension from the block or slide $F^3$, a vertically sliding frame or block $L^3$, sustained by said arm and carrying a pivoted finger or hook adapted to take hold of a formed link, a catch for holding the arm depressed, a feed mechanism, intermediate devices between said mechanism, and the block or frame $L^3$, whereby the latter may be turned through an angle of approximately ninety degrees as the feed mechanism comes forward to feed the material, and a releasing device for disengaging the catch when the feed mechanism has moved the wire or blank sufficiently to thread its end through the formed link.

35. In a chain making machine, the combination with a vertically movable block or slide $L^3$, carrying a pivoted finger, of a sustaining arm or support, a catch for holding the support in depressed position, mechanism for turning the block or frame with the formed link into position to receive the end of a new blank, and means for releasing said catch after the feeding mechanism has moved the forward end of the blank through the link.

36. The combination in a chain making machine with the movable finger or hook for supporting a formed link, of the springs tending to move the same in opposite directions, and a stop or abutment for receiving the pressure of one of said springs when the hook is to be turned or moved by the other.

37. In a chain making machine, the combination of the sliding block or carrier $L^3$, a spindle $M^6$, upon which the same is adapted to slide and rotate a pivoted hook or finger pivoted on said carrier, a spring which holds the finger normally open, and a second spring which tends to close the finger when relieved from the pressure of the first named spring when the frame is lowered for the purpose of taking hold of a formed link.

38. In a chain making machine, a sliding frame or block $L^3$, carrying a pivoted hook or finger, in combination with a spindle $M^6$, upon which the frame slides, a spring tending to hold the hook or finger in open position, and a shoulder on the spindle or standard for relieving the finger from the action of the spring when the frame and finger are lowered together.

39. The combination in a chain making machine, of a block or carrier $L^3$, sliding on a vertical standard, a pivoted finger mounted thereon, a spring $L^6$, tending to hold the finger open, a spring $L^9$, tending to close it and a stop for receiving the pressure of the spring $L^6$, when the support $L^3$, is lowered.

40. The combination, substantially as described, in a chain making machine, of a block or frame $L^3$, having arms which slide and rotate upon a standard $L^5$, a hook $L^2$, carried by said frame, a pivoted hook or finger L, pivoted thereon, a spring $L^9$, tending to close the finger, a spiral spring $L^6$, pressing upon the heel of the finger and holding the same normally open, and a stop or shoulder upon the spindle to receive the pressure of the spring $L^6$, when the devices are lowered.

41. In a chain making machine, the combination, substantially as described, of a former, a feed mechanism, a reciprocating mandrel, a cutter, a hook or finger supported by a vertically sliding and rotating block or frame, a vertically moving arm or support sustaining the latter, means for lowering the arm on backward movement of the mandrel, mechanism actuated or controlled by the feeding devices for turning the block which supports the fingers after the same has been lowered and taken hold of a formed link, a catch for holding the sustaining arm depressed, and a releasing dog or detent for actuating said catch when the feed mechanism has moved the wire or blank through the previously formed link, as and for the purpose described.

42. The combination in a chain making machine, of the rotary frame or block $L^3$, supporting the carrying finger or hook, a step by step feed mechanism for feeding the wire or material through a link supported by said hook, and actuating devices for said block or carrier engaged by the feed mechanism, as and for the purpose described.

43. The combination with a block or frame $L^3$, supporting the carrying hook or finger and adapted to rotate in a horizontal plane, of a feed mechanism for feeding the wire or material through a previously formed link, an actuating rod P⁴, connected through a suitable lever and link with the said rotary block L³, a spring tending to move the block L³, around into position to present the link with its bent side in line with a new blank, and a feed mechanism having an actuating arm which engages with said rod P⁴, and moves the same in opposition to the spring.

44. The combination in a chain making machine, of a main shaft B, a former or formers rotating in a plane parallel with the plane of rotation of said shaft and connected thereto through suitable gear, a shaft B⁴, arranged at right angles to the main shaft and connected therewith through suitable gearing, a reciprocating mandrel reciprocating in a line at right angles to the plane of rotation of the former or formers, a feed mechanism for feeding the material into position in the formers, and a cutter, said feed mechanism, cutter and mandrel having suitable actuating mechanism operated by the shaft B⁴.

45. In a chain making machine, the combination, substantially as described, of a main driving shaft B, a former or formers geared thereto and rotating in a plane parallel therewith, a shaft B⁴, at right angles from the first, but connected therewith through suitable gear, a cam on said shaft, and a reciprocating mandrel actuated by said cam and reciprocating in a line parallel with the shaft of the former.

46. In a chain making machine, the combination, substantially as described, of rotary reciprocating formers connected through suitable intermediate gear with a shaft B⁶, a shaft B⁴, connected with the first through a bevel gear, a reciprocating mandrel reciprocating in a line parallel with the former shafts and to and from said formers, a cam on the shaft B⁴, for actuating the mandrel, and a cutter also actuated by the cam on said shaft.

47. The combination in a chain making machine, of a reciprocating cutter bar I, a reciprocating feeding mechanism, two rotary formers rotating in opposite directions through substantially a half circumference of a circle, a clutch mechanism for periodically connecting the same with a suitable driving power, a reciprocating mandrel working in suitable guides in a line parallel with the former shafts, and a vertically sliding and horizontally rotating finger or hook, as and for the purpose described.

48. The combination in a chain making machine, of rotary formers C, C², adapted to reciprocate through substantially a half circumference of a circle, a reciprocating mandrel having a vertically divided end and working on a suitable guide in line parallel with the former shafts, a feed mechanism adapted to feed at each operation a length of material sufficient to form a link, a cutter, and a hook or finger supported on a vertically guided block or frame, and means for lowering said block or frame to cause the finger to take the link from the mandrel at each rearward movement of the latter.

49. The combination with a reciprocating feed mechanism, the swinging support carrying the hook or finger for taking the link off the mandrel and intermediate devices for swinging said support through engagement of the said reciprocating feed mechanism, and an operating cam for the feed mechanism, as and for the purpose described.

50. The combination in a chain making machine, of the reciprocating cutter bar I, toggle joint levers I⁵, I⁴, connected to a head I⁸, a rod I⁹, carrying shoe I¹³, and guiding cam I¹², engaging with the said shoe, and a suitable spring surrounding the rod I⁹ applied between the head and a proper abutment for lowering the cutter after each cutting operation.

51. The combination, substantially as described, of the cutter bar, the toggle joint levers pivoted to a head I⁸, a rod connecting the same with a shoe, an actuating cam, and a stay rod I¹⁵, connecting the head and shoe.

52. The combination in a chain making machine, with the feed mechanism, of the operating lever G⁸, the cam, and the pivot G¹¹, adjustable in the hanger and in a slot in the lever.

53. The combination, substantially as described, in a chain making machine, of formers mounted on parallel shafts and each adapted to move through approximately half the circumference of a circle, a suitable gear train for rotating the wheels in opposite directions, a driving shaft, an automatic clutch for connecting and disconnecting the formers with the driving bar, a spring or retractor for moving the formers into position to receive a new blank when they are disconnected from the driving mechanism, a reciprocating mandrel, means for moving the same backward and forward in a line parallel with the former shafts, a feed mechanism, a cutter for cutting off the blank, mechanism for actuating the same at the termination of each feed movement, a movable hook or finger for taking hold of the formed link as the mandrel is drawn back, a vertically movable support sustaining said finger, mechanism for lowering the same at each rearward movement of the mandrel, and means for turning the finger after it has caught the link through an angle of approximately ninety degrees in time to receive the free end of a blank which is fed through it by the feed mechanism.

54. The combination in a chain making machine, of a former mounted on a rotary reciprocating shaft, a mandrel, mechanism for reciprocating the latter in a line with the former shaft, a feed mechanism for feeding the material in a line transverse to the movement of said mandrel, a cutter for cutting off the length of material when in proper position with relation to the former, and a suitable finger or pick-up mechanism for taking hold of a formed link as the same slips from the mandrel on the backward movement of said mandrel and turning the formed link opposite the former and around into a plane in which the material may be threaded through it.

55. The combination, substantially as described, in a chain making machine, of a shaft $B^6$, carrying an attached wheel $C^6$, a wheel $C^5$, carrying a clutch pin and geared through suitable wheels with a former or formers mounted on the end of a rotary shaft or shafts, a shaft $B^4$, gearing with a shaft $B^6$, a mandrel working in suitable guides in a line parallel with the shaft carrying the former, a step by step feed mechanism having a sliding clamp jaw, a horizontal lever connecting the same, a vertical actuating lever, a cam on the shaft $B^4$, operating said actuating lever with lost motion, a cutter, a cam on said shaft $B^4$, for actuating said cutter, and an actuating cam on said shaft for operating the mandrel.

56. In a chain making machine, the combination with the carrier block $L^3$, working in suitable guides toward and away from the mandrel, of two fingers or hooks $L, L^2$, one of which is pivoted on said carrier, and is moved to and from the other as the carrier rises and falls, as and for the purpose described.

Signed at Lynn, in the county of Essex and State of Massachusetts, this 11th day of December, A. D. 1890.

ELIHU THOMSON.
   CHARLES E. HARTHAN.

Witnesses:
 JOHN W. GIBBONEY,
 BENJAMIN B. HULL.